US006793142B2

(12) United States Patent
Yap

(10) Patent No.: US 6,793,142 B2
(45) Date of Patent: Sep. 21, 2004

(54) CONTEXT SENSITIVE INFORMATION ACCESS ARTIFACTS

(75) Inventor: Sue-Ken Yap, Lane Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 09/737,749

(22) Filed: Dec. 18, 2000

(65) Prior Publication Data

US 2002/0059366 A1 May 16, 2002

(30) Foreign Application Priority Data

Dec. 23, 1999 (AU) ............................................... PQ4858

(51) Int. Cl.[7] .............................................. G06K 19/06
(52) U.S. Cl. ..................................................... 235/492
(58) Field of Search .............................. 735/492, 494, 735/380, 381, 441; 705/5; 235/492, 494, 380, 381, 441; 715/16; 273/237

(56) References Cited

U.S. PATENT DOCUMENTS

| 5,002,062 A | | 3/1991 | Suzuki ...................... 128/696 |
| 5,049,728 A | * | 9/1991 | Rovin ........................ 235/492 |
| 5,353,016 A | | 10/1994 | Kurita et al. ................ 340/825 |
| 5,601,489 A | | 2/1997 | Komaki ........................ 463/44 |
| 5,841,119 A | * | 11/1998 | Rouyrre et al. .............. 235/380 |
| 5,880,769 A | * | 3/1999 | Nemirofsky et al. ......... 725/139 |
| 5,949,492 A | | 9/1999 | Mankovitz ................... 348/473 |
| 5,973,475 A | | 10/1999 | Combaluzier ................ 320/107 |
| 6,014,593 A | | 1/2000 | Grufman ..................... 700/136 |
| 6,229,694 B1 | | 5/2001 | Kono .......................... 361/683 |
| 6,257,486 B1 | * | 7/2001 | Teicher et al. ............... 235/380 |

FOREIGN PATENT DOCUMENTS

| AU | 53527/99 | * 4/2000 |
| DE | 36 37 684 | 5/1987 |
| EP | 0 798 675 | 10/1997 |
| EP | 1 001 587 | 5/2000 |
| JP | 59-123986 | 7/1984 |
| JP | 3-71329 | 3/1991 |
| JP | 4-88547 | 3/1992 |
| WO | WO 95/35534 | * 12/1995 ........... G06F/3/023 |

* cited by examiner

Primary Examiner—Thien M. Le
Assistant Examiner—Lisa M. Caputo
(74) Attorney, Agent, or Firm—Fitzpatrick, Cella, Harper & Scinto

(57) ABSTRACT

A context sensitive device including a card portion (101) having a number of user interpretable icons (e.g. 122), an electronic apparatus (106) attached to the card portion (101) which includes a memory unit in which are retained character strings, including contextual information, associated with the corresponding icons (122). The apparatus (106) also has a processor unit coupled to the memory unit, and a communication unit for coupling the processor to a reading device (302), which is configured to facilitate reading the context sensitive device. The processor is configured to relate reading signals resulting from a user selection of one of the icons (122), and received via the communication unit with at least one of the stored character strings, to thus transmit an output signal for indicating a desired service based on the contextual information.

59 Claims, 16 Drawing Sheets

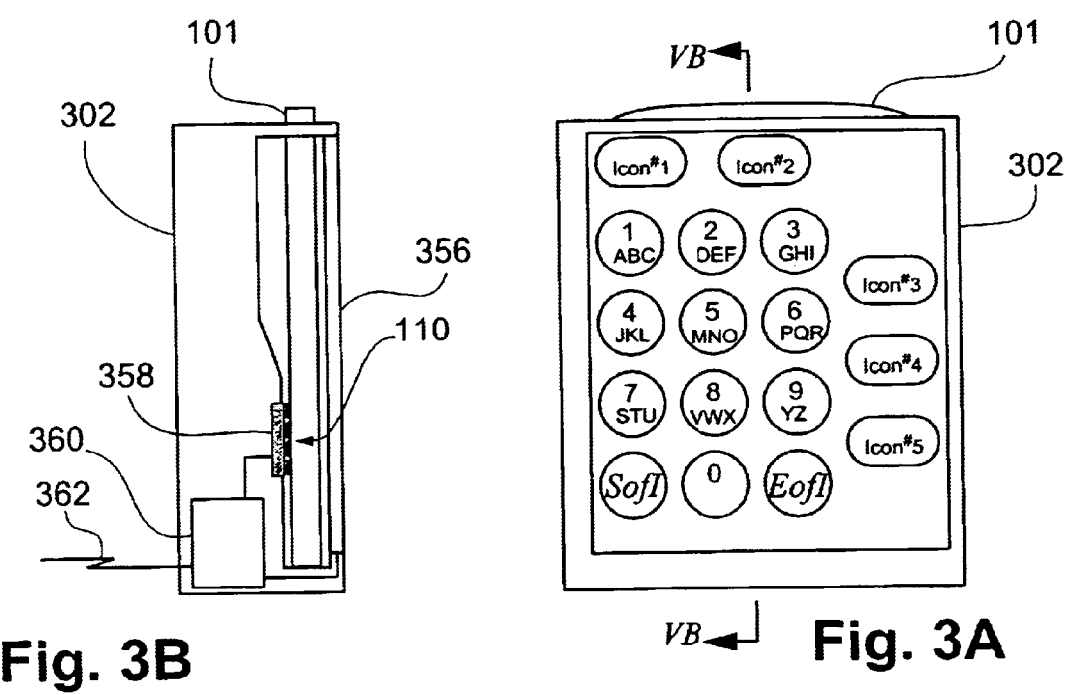
Fig. 3B  Fig. 3A

US 6,793,142 B2

CONTEXT SENSITIVE INFORMATION ACCESS ARTIFACTS

TECHNICAL FIELD OF THE INVENTION

The present invention relates generally to systems enabling access to context specific information and, in particular, to a system for constructing context sensitive information access artifacts. The invention has been developed primarily for access to context specific information and will be described hereinafter with reference to these and related applications. However, it will be appreciated, particularly in view of the large number of alternative examples given, that the invention is not limited to these fields of use.

BACKGROUND ART

Various means are known for customizing the delivery of content information based on physical location. For example, in the field of Internet content delivery, there are Web servers which can deliver different content, based on metadata that is sent from the Web browser. The MICROSOFT™ owned HOTMAIL™ Web mail service decides, based on an Internet Protocol (IP) address ending in .au, that a user resides in Australia and consequently presents advertising links to 'MICROSOFT NETWORK (MSN) AUSTRALIA™'. However, using an IP address to predict physical location is inaccurate since some companies with offices in Australia have IP addresses that end in .com.

Other known means for delivering content information based on physical location utilise Global Positioning System (GPS) technology. For example, some computers are fitted with a GPS transmitter, which relays the position of the computer to a computer network via a GPS satellite. However, GPS systems are only accurate in the range of hundreds of meters in the case of Absolute GPS, or tens of meters in the case of Differential GPS. These inaccuracies are not sufficient for computer applications where different rooms of the same building may require a computer application to use different context information.

DISCLOSURE OF THE INVENTION

According to one aspect of the present invention there is provided a context sensitive device comprising:
a card portion having a surface onto which are formed a plurality of user interpretable icons; and
electronic apparatus attached to said card portion, said apparatus comprising:
  a memory in which are retained at least a plurality of character strings including contextual information, each of said character strings being associated with a corresponding one of said icons;
  processor means coupled to said memory means; and
  communication means for coupling said processor means to a reading device configured to facilitate reading said context sensitive device,
wherein said processor means is configured to relate reading signals generated from a user selection of at least one of said icons and received via said communication means with at least one of said retained character strings to thus transmit an output signal for indicating a desired service based on said contextual information.

According to another aspect of the present invention there is provided a method of using a context sensitive device to enable performance of a desired service, said context sensitive device comprising:
a card portion having a surface onto which are formed a plurality of user interpretable icons; and
electronic apparatus attached to said card portion, said apparatus comprising:
  a memory in which are retained at least a plurality of character strings including contextual information, each of said character strings being associated with a corresponding one of said icons;
  processor means coupled to said memory means; and
  communication means for coupling said processor means to a reading device configured to facilitate reading said context sensitive device;
said method comprising the steps of:
  (a) relating reading signals generated from a user selection of at least one of said icons and received via said communication means with at least one of said retained character strings including a portion of said contextual information;
  (b) transmitting an output signal including said at least one retained character string, wherein said output signal indicates said desired service;
  (c) comparing said portion of contextual information to an actual portion of contextual information; and enabling said performance of said desired service based on said comparison.

According to still another aspect of the present invention there is provided a context sensitive device comprising:
a card portion and an electronic apparatus attached to said card portion, said apparatus comprising:
  a memory in which are retained at least a plurality of character strings including contextual information;
  processor means coupled to said memory means; and
  communication means for coupling said processor means to a reading device configured to facilitate reading said context sensitive device,
wherein said processor means is configured to transmit an output signal including a portion of said contextual information, for indicating a desired service based on said contextual information.

According to still another aspect of the present invention there is provided a context sensitive device comprising:
a card portion having a surface onto which are formed a plurality of user interpretable icons;
a memory in which are retained at least a plurality of character strings including contextual information, each of said character strings being associated with a corresponding one of said icons; and
communication means for coupling said memory to a processor means of a reading device configured to facilitate reading said context sensitive device,
wherein said processor means is configured to relate reading signals generated from a user selection of at least one of said icons and received via said communication means with at least one of said retained character strings to thus transmit an output signal for indicating a desired service based on said contextual information.

According to still another aspect of the present invention there is provided a context sensitive service provision system comprising:
a control template, adapted for insertion into a template reader, the template (i) having at least one user selectable control icon, and (ii) storing a character string associated with said at least one icon, said character string incorporating icon contextual information;
said reader, being responsive to a user selection of said at least one control icon of an inserted said control template, said reader being adapted to communicate a signal including said associated character string; and a service provision device, responsive to a communicated said signal, and adapted to provide a service corresponding to the associated character string dependent upon the icon contextual information contained in said communicated signal.

According to still another aspect of the present invention there is provided a control template, adapted for insertion into a template reader for use in a context sensitive service provision system, the control template comprising:

at least one user selectable control icon; and storage means for storing a character string associated with said at least one icon, said character string incorporating icon contextual information.

According to still another aspect of the present invention there is provided a method of providing a context sensitive service, the method comprising steps of:

inserting a control template into a template reader, the template (i) having at least one user selectable control icon, and (ii) storing a character string associated with said at least one icon, said character string incorporating icon contextual information;

selecting, by a user, said at least one control icon;

communicating, by said reader, in response to the user selection, a signal including said associated character string;

receiving, by a service provision device, of said communicated signal; and providing, by the service provision device, a service corresponding to the associated character string dependent upon the icon contextual information contained in said communicated signal.

According to still another aspect of the present invention there is provided a computer readable medium for storing a program for a system providing context sensitive information; wherein a control template is inserted into a template reader, the template (i) having at least one user selectable control icon, and (ii) storing a character string associated with said at least one icon, said character string incorporating icon contextual information; and wherein said at least one control icon is selected by a user; said program comprising:

code for a communicating step, for communicating, by said reader, in response to the user selection, a signal including said associated character string;

code for a receiving step, for receiving, by a service provision device, of said communicated signal; and code for a providing step, for providing, by the service provision device, a service corresponding to the associated character string dependent upon the icon contextual information contained in said communicated signal.

According to still another aspect of the present invention there is provided a computer readable medium for storing a program for using a context sensitive device to enable performance of a desired service; wherein said context sensitive device comprises:

(i) a card portion having a surface onto which are formed a plurality of user interpretable icons, and electronic apparatus attached to said card portion; said apparatus comprising:

(a) a memory in which are retained at least a plurality of character strings including contextual information, each of said character strings being associated with a corresponding one of said icons;

(b) processor means coupled to said memory means; and (c) communication means for coupling said processor means to a reading device configured to facilitate reading said context sensitive device;

said program comprising:

(a) code for a relating step for relating reading signals generated from a user selection of at least one of said icons and received via said communication means with at least one of said retained character strings including a portion of said contextual information;

(b) code for a transmitting step for transmitting an output signal including said at least one retained character string, wherein said output signal indicates said desired service;

(c) code for a comparing step for comparing said portion of contextual information to an actual portion of contextual information; and (d) code for an enabling step for enabling said performance of said desired service based on said comparison.

BRIEF DESCRIPTION OF THE DRAWINGS

A number of preferred embodiments of the present invention will now be described with reference to the drawings, in which:

FIGS. 3A and 3B are front elevational and vertical sections respectively of a smart-card and associated reader;

DETAILED DESCRIPTION INCLUDING BEST MODE

Figures 1, 2:
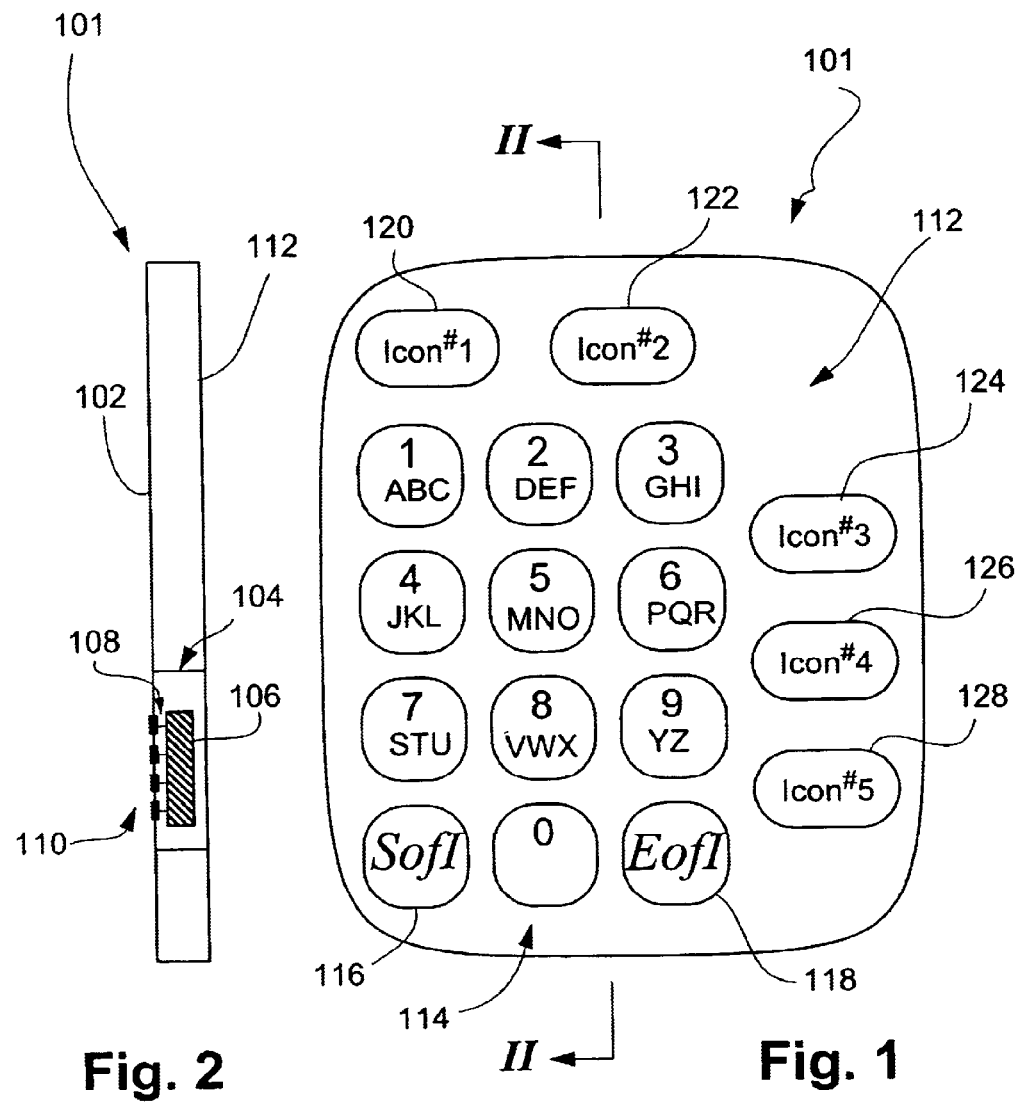
FIG. 1 is a plan view of a smart-card configured for use as a context sensitive smart-card in accordance with the preferred embodiment.
FIG. 2 is a vertical cross-section along the line II—II of FIG. 1.

Where reference is made in any one or more of the accompanying drawings to steps and/or features, which have the same reference numerals, those steps and/or features have for the purposes of this description the same function(s) or operation(s), unless the contrary intention appears.

FIGS. 1 and 2 show a context sensitive smart-card 101 configured according to the embodiments of the present invention and which includes a substantially planar card portion 102 onto which a user interface surface 112 is formed. The smart-card 101 also preferably includes a portion 104 formed in the card portion 102 and which encloses an embedded computer chip 106 capable of performing communication and memory functions. The computer chip 106 is electrically coupled 108 to a number of external contacts 110 that provide for communication of data between the smart-card 101 and a smart-card reader (to be described). Connections to the chip 106 are formed by communication connections 110, seen in FIG. 2, arranged at an outer surface of the card 101.

The user interface surface 112 has provided thereon a number of graphical icons, a first group of which depict an alphanumeric keypad 114 in a fashion similar to keypads known in the art of telecommunications and like arrangements. A number of other user or service provider (eg. a telecommunications company) customisable icons 120, 122, 124, and 126–128 can also be provided. The smart-card 101 is preferably pre-programmed by a user. Alternatively, the smart-card 101 is pre-programmed by a service provider and supplied to the user for a fee. The icons 114, 116, 118, 120, 122, 124, 126, and 128 configured upon the surface 112 are each associated with an x-y co-ordinate mapping retained within the computer chip 106 and which provides for interpretation of a user selection of any one of the icons 114–128 (to be described).

As seen from FIGS. 3A and 3B, the smart-card 101 is inserted into a reader 302 such that a transparent touch sensitive panel 356 overlies the printed icons on the surface 112. An electrical connection is made at 358 to the chip 106 whereby an electronics module 360 of the reader 302 can relate a touching of the panel 356 with the underlying icon 114–128 through interpretation of the data transferred via the chip 106.

Figure 9:
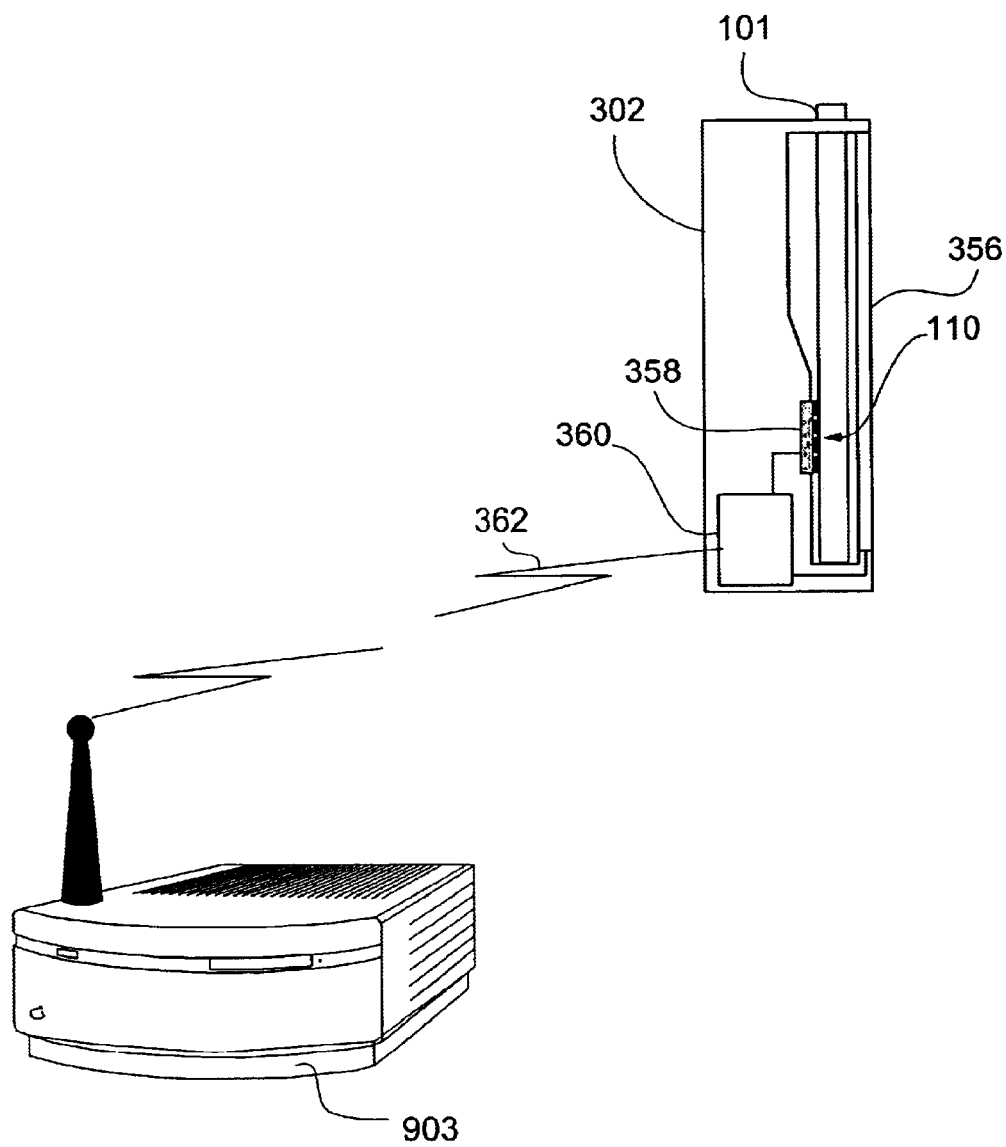
FIG. 9 shows further process, comprising a sequence of method steps, for context sensitive service provision, using a control template.

A signal 362 output from the reader 302 may be used to provide for implementation of a service, via a base station 903, as seen in FIG. 9, depending on context information received by the base station 903, in accordance with the smart-card 101 of the embodiments. The smart-card reader 302 is preferably connected to the base station 903 via a two-way digital communications link 362 such as a Radio Frequency (RF) Link. However, any known communications link (eg. infra-red) can be used with the embodiments.

Figure 4:
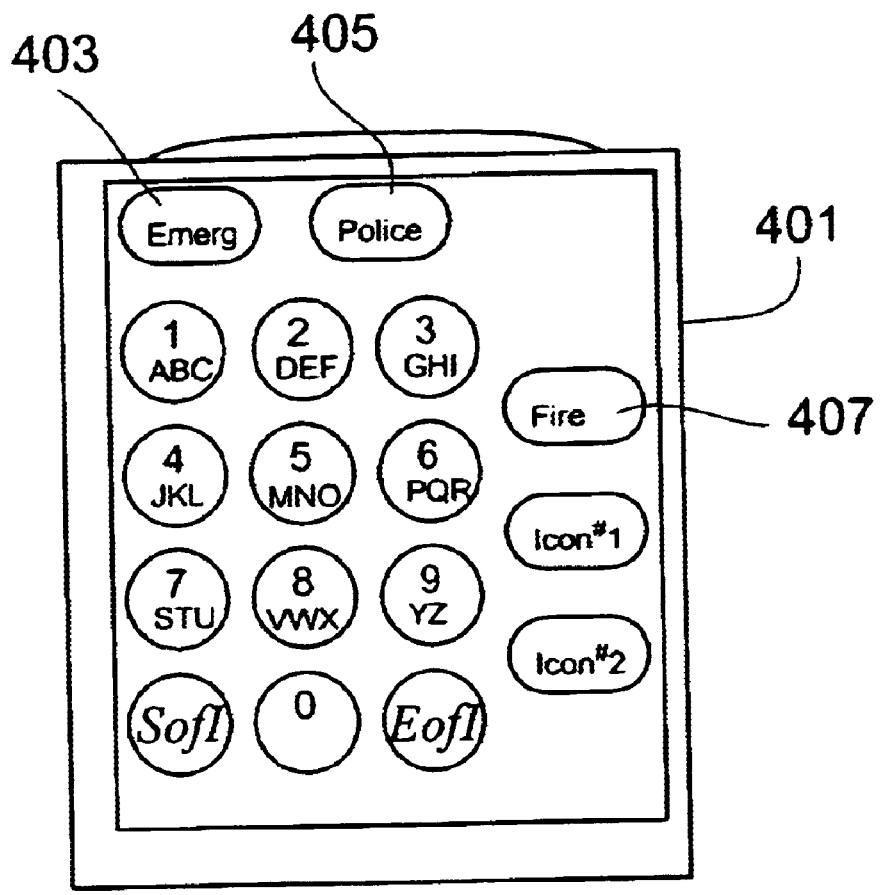
FIG. 4 shows the context sensitive smart-card reader of FIG. 3B and a base station.

In a first embodiment of the present invention, a user is provided with a smartcard 401, as seen in FIG. 4, which serves as a phone dialer card when inserted into the reader 302. The card 401 comprises several icons 403, 405 and 407, which have been labelled "Emergency", "Police" and "Fire", respectively. The icons 403, 405, and 407 have been preferably pre-programmed with telephone numbers, by a user or a service provider (eg. a telecommunications company), for the respective emergency services related to the icons 401 to 405. The method of programming the smart-card 401 will be described later in this document with reference to FIG. 5. As emergency service telephone numbers differ from country to country, the smart-card 401 preferably includes a pre-programmed table of all of the telephone numbers, including the country codes for the countries in which the card 401 has been designated to operate in by the service provider or user.

Figure 10:
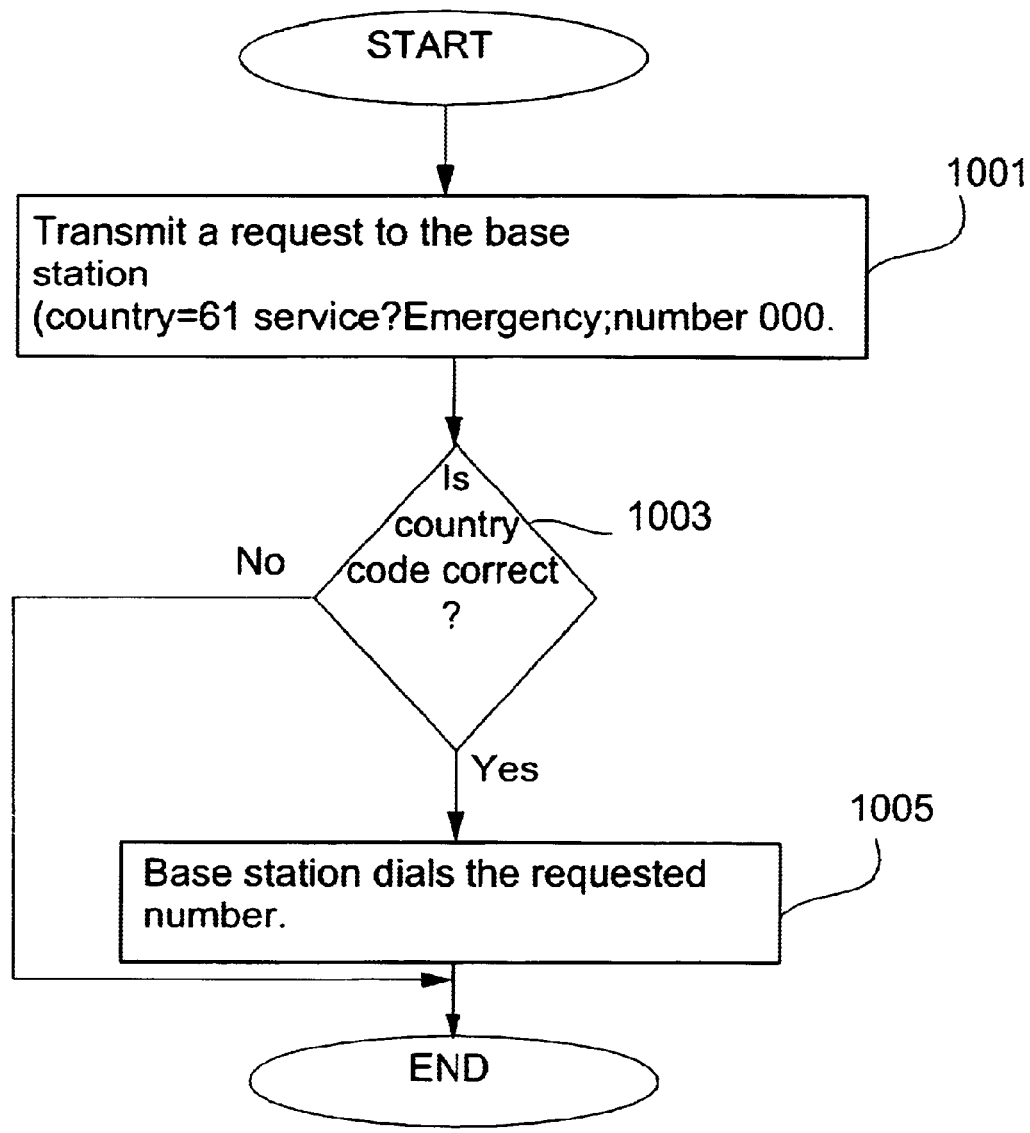
FIG. 10 is a flow chart showing the operations of a smart-card in accordance with the second embodiment.

FIG. 10 is a flow chart showing the sequence of communications that would occur between the reader 302 and the base station 903, if the user inserted the card 401 into the reader 302 and pressed the icon 403 labeled "Emergency". The process begins at step 1001, where if the user happens to be in Sydney, Australia, the reader 102 transmits the following command to the base station 903:

country=61 service?Emergency;number 000.

The country code sent by the reader 302 is preferably pre-programmed into the reader 302, by the user, and stored in the reader 302. Alternatively, the country code is retained by the reader 302 from a previous use. The base station 903 is preferably preprogrammed by the service provider as to which country the base station 903 is being used in. At the next step 1003, upon receiving the above command, the base station 903 checks the country code against the location in which the base station 903 resides. In the present example, if the base station 903 is located in Australia having a country code of 61, the command is accepted by the base station 903 which then dials the number 000, at step 1005.

Figure 11:
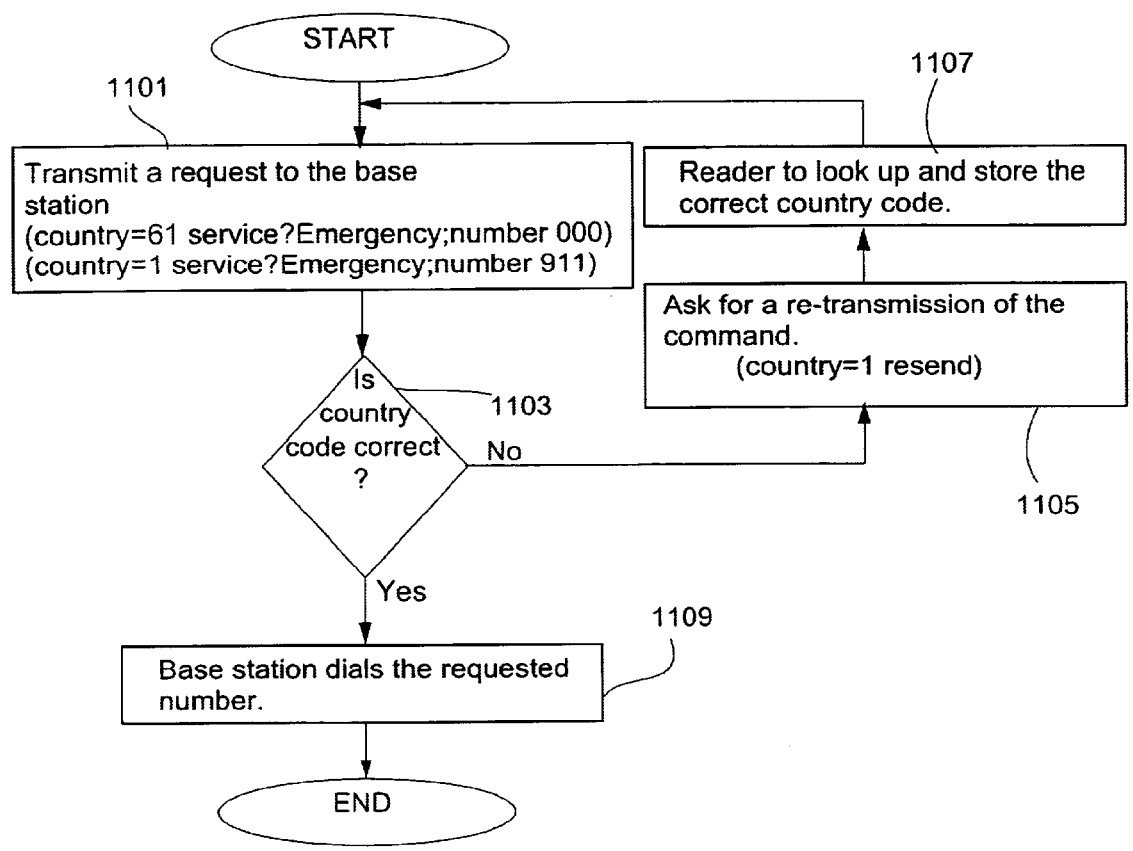
FIG. 11 is a flow chart showing operations of a smart-card in accordance with a second embodiment of the present invention.

FIG. 11 is a flow chart showing the sequence of communications that would result between the reader 302 and another base station (not illustrated) which is located in the U.S.A., if the user then took the smart-card 401 and smart-card reader 302 to New York, U.S.A., and again pressed the icon 403 labelled Emergency. The process begins at step 1101, where the same command as above is sent to the base station (not illustrated) which is located in the U.S.A. At the next step 1103, the base station checks to see if the country code is correct (i.e. country =1). If the country code is incorrect the U.S.A. located base station would indicate to the reader 302, at step 1105, that the reader 302 should resend the command with the correct country code by sending:

country=1 resend.

The process continues at step 1107, where the reader 302 can use the new country code (ie. country=1) to look up the correct data for the requested service by searching the table stored in the smart-card 401. The process then returns to step 1101, where the reader 302 sends the following command to the U.S. base station:

country=1 service?Emergency;number 911.

The process concludes at step 1109, where the U.S.A. located base station dials the emergency number (ie. 911) and the reader 302 preferably stores the correct country code (ie. country=1) in a memory until the country code is contradicted by another base station. Thus, the service can be represented on the card 401 as being location independent.

Figure 13:
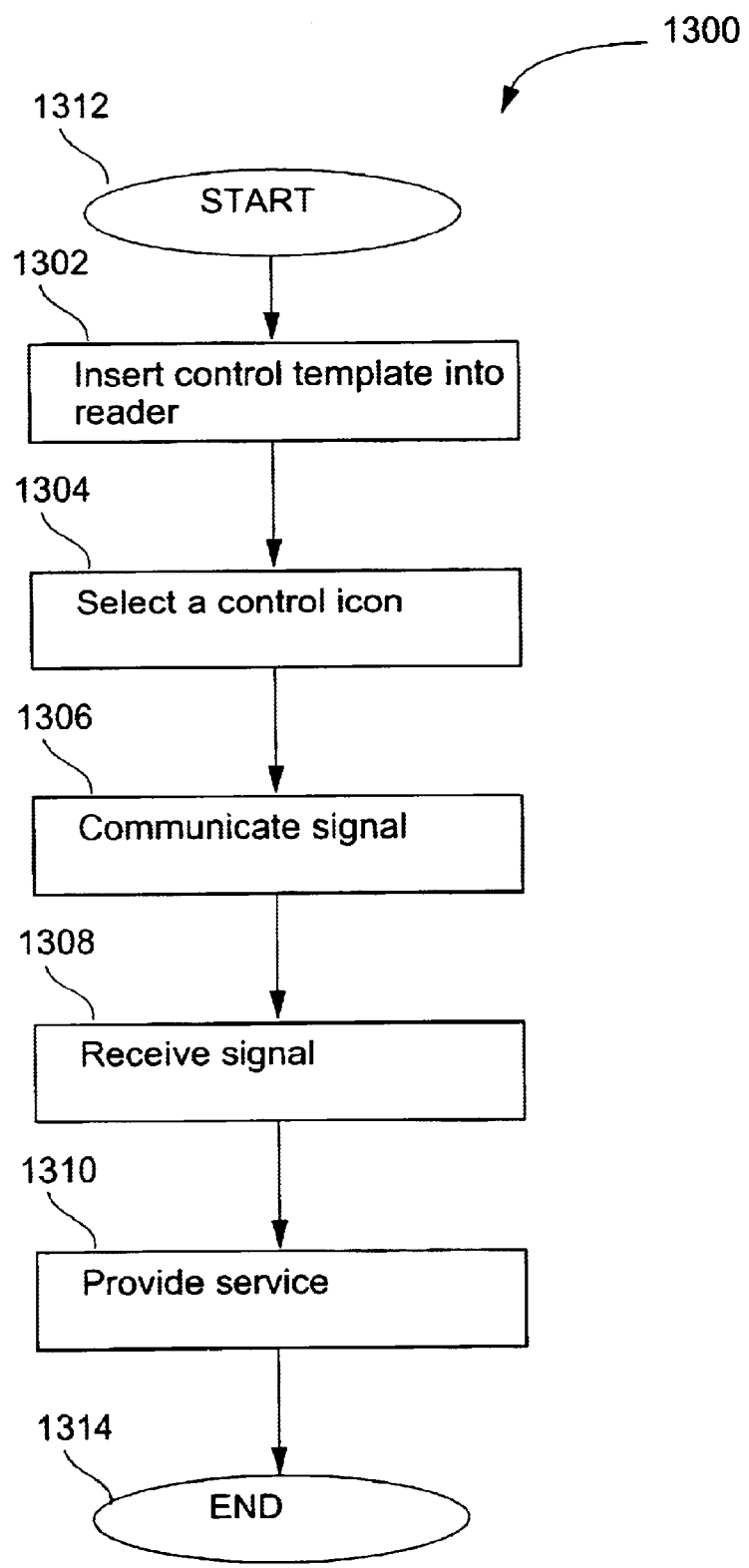
FIG. 13 shows a process for placing a call to the aforementioned support office.

FIG. 13 shows a generic process 1300, in the form of a sequence of method steps, for context sensitive service provision, using a control template. The process 1300 commences at 1312, and in a subsequent step 1302, a user inserts the control template (eg the phone dialler card shown in FIG.

4) into a reader. Thereafter, in a step 1304, the user selects a control icon on the surface of the template, this action communicating a signal, as depicted in a subsequent step 1306 from the reader to a service provision device.

Figure 5:
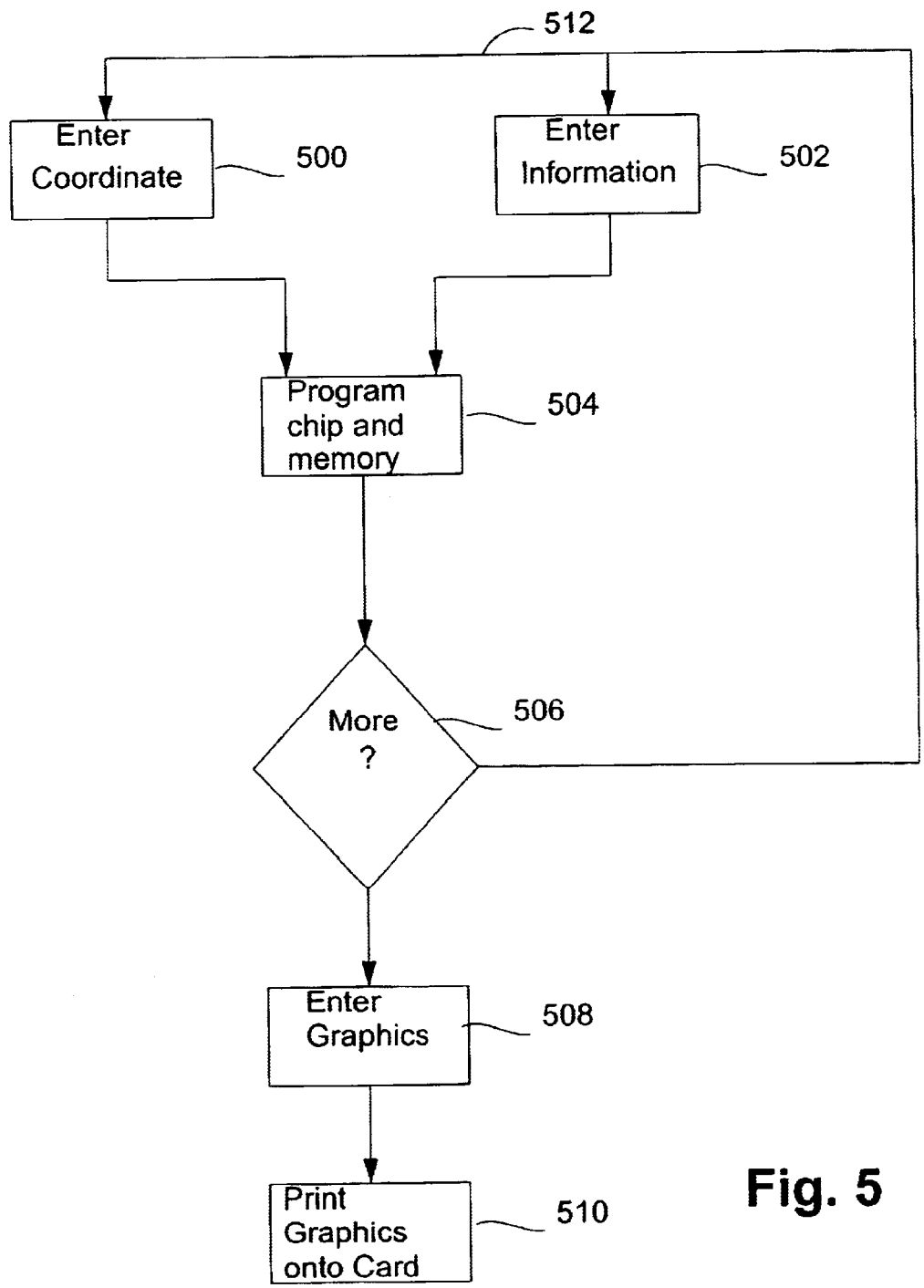
FIG. 5 is a plan view of a smart-card in accordance with a second embodiment of the present invention.
Figure 6:
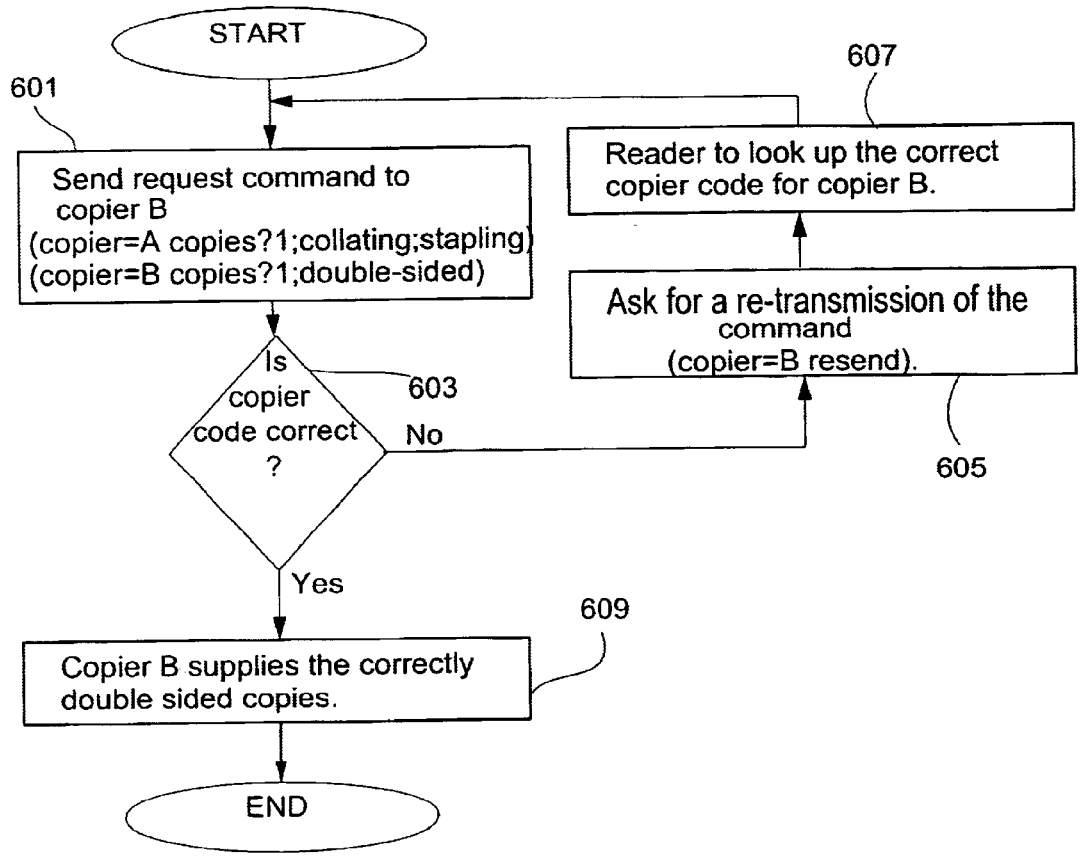
FIG. 6 is a flow chart showing the operations of a smart-card in accordance with a first embodiment of the present invention.
Figure 7:
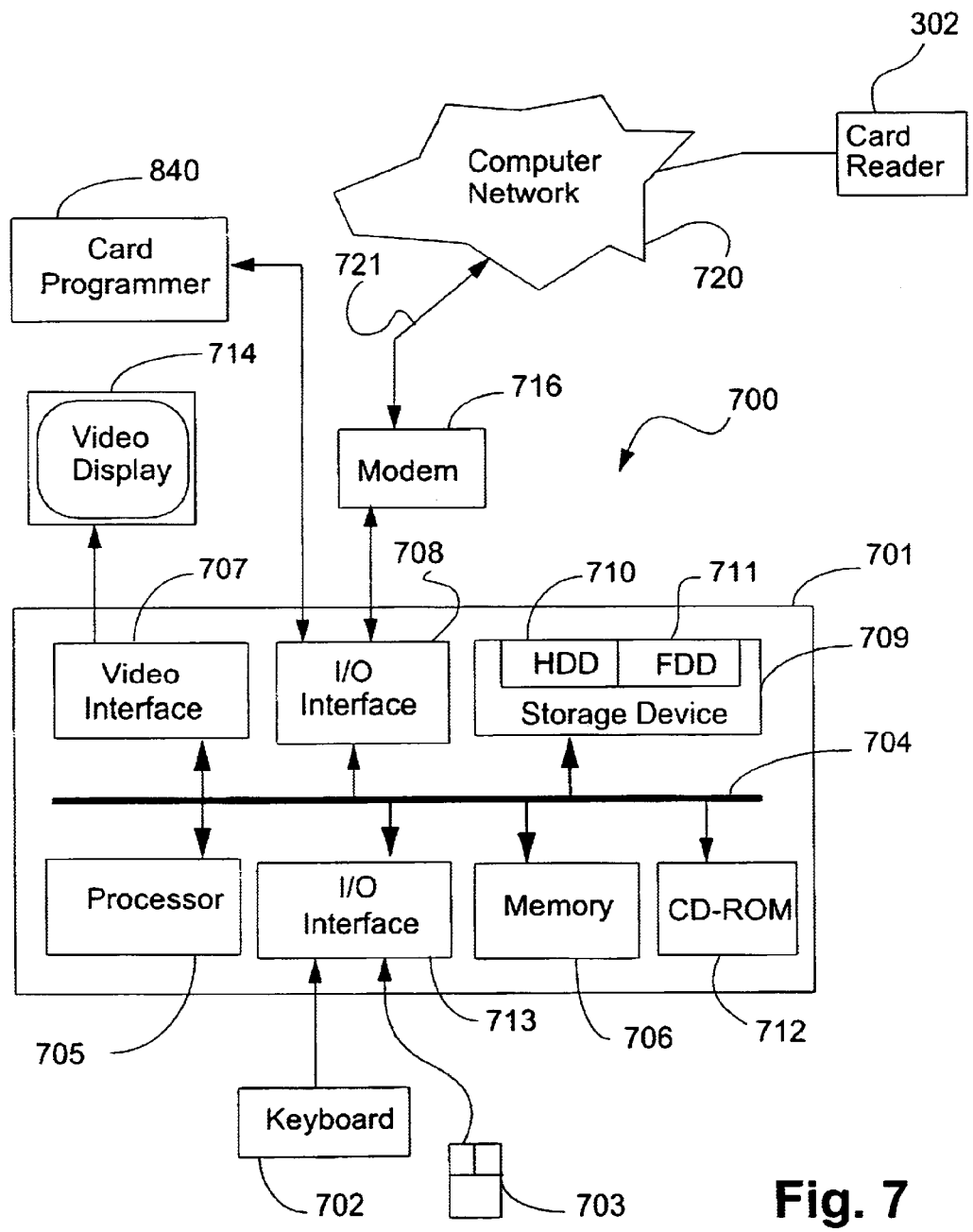
FIG. 7 is a flow chart showing the operations of a smart-card in accordance with the first embodiment.

In the description relating to FIGS. 5, 6 and 7, the "service provision device" is an "intelligent telephone" (not shown) by which the user makes emergency calls over a telecommunications network (not shown) to appropriate service providers for example the police. The intelligent telephone is intelligent by virtue of the ability to receive, analyse and respond to the signals from the control template and associated reader. It will be apparent that the intelligent phone has sufficient processing capability to perform the aforementioned analysis and response functions, and that accordingly such a phone has comparable processing capabilities, for example, to public telephones which accept payment by smart-card. The smart-cards used for such public phones are pre-paid, and the public phone can (i) read an amount of funds remaining on the smart-card, (ii) check that there are sufficient funds remaining on the card to pay for the intended call, and (iii) debit the smart-card for the cost of the call, thereafter updating the smart-card with a new, reduced balance of funds remaining.

In a following step 1308 of the process 1300, the aforementioned signal is received by the service provision device, which provides the service (ie providing communications between the user and the police) in a step 1310. The process 1300 terminates thereafter in a step 1314.

Figure 14:
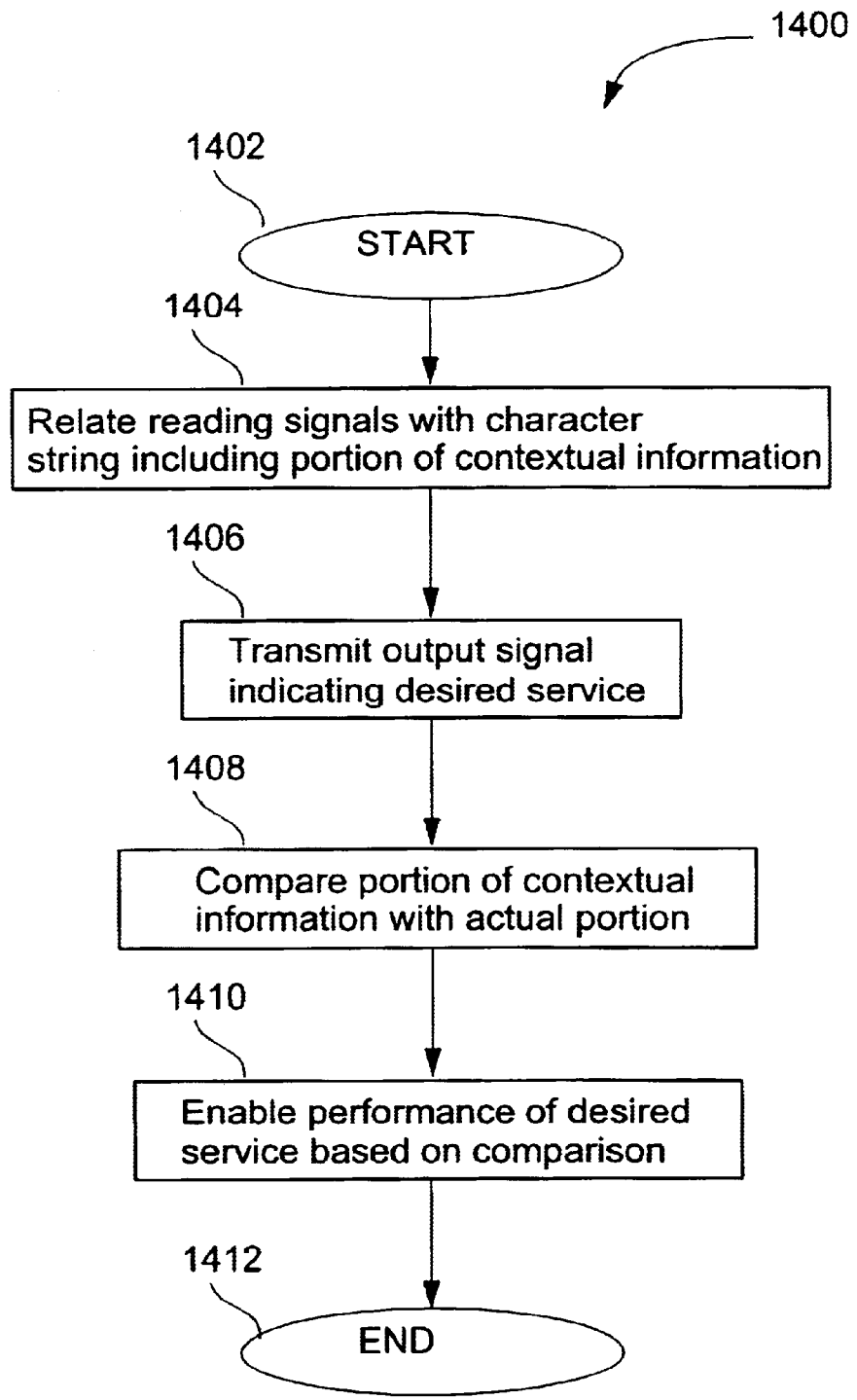
FIG. 14 shows a process comprising a sequence of method steps, for another example of placing a call to the aforementioned support office.

FIG. 14 shows a more detailed process 1400, comprising a sequence of method steps, for context sensitive service provision, using a control template. The process 1400 commences at a step 1402. In a subsequent step 1404, a user selection of at least one icon on the template relates signals generated from the user selection with a corresponding stored character string which includes contextual information. In a following step 1406, an output signal including the stored character string is transmitted, thereby indicating the desired service. Thereafter, in a step 1408, the transmitted contextual information is compared to an "actual" portion of contextual information, and performance of the desired service is enabled, in a step 1410, dependent upon the outcome of the comparison. The process 1400 terminates in a step 1412.

In a second embodiment of the present invention a user can be provided with a photocopier card in the form of the smart-card 101 which has been pre-programmed with a table including settings for various copiers in a building. The copiers preferably include a built in smart-card reader in the form of the smart-card reader 302, and a processor (not illustrated). The smart-card 101 of the second embodiment includes an icon labelled as "Copy" (not illustrated). As an example, the user can use the card 101 of the second embodiment to collate and staple on copier A (not illustrated) whenever that machine is used, and to do a double-sided copy on copier B (not illustrated) whenever that machine is used.

Figure 12:
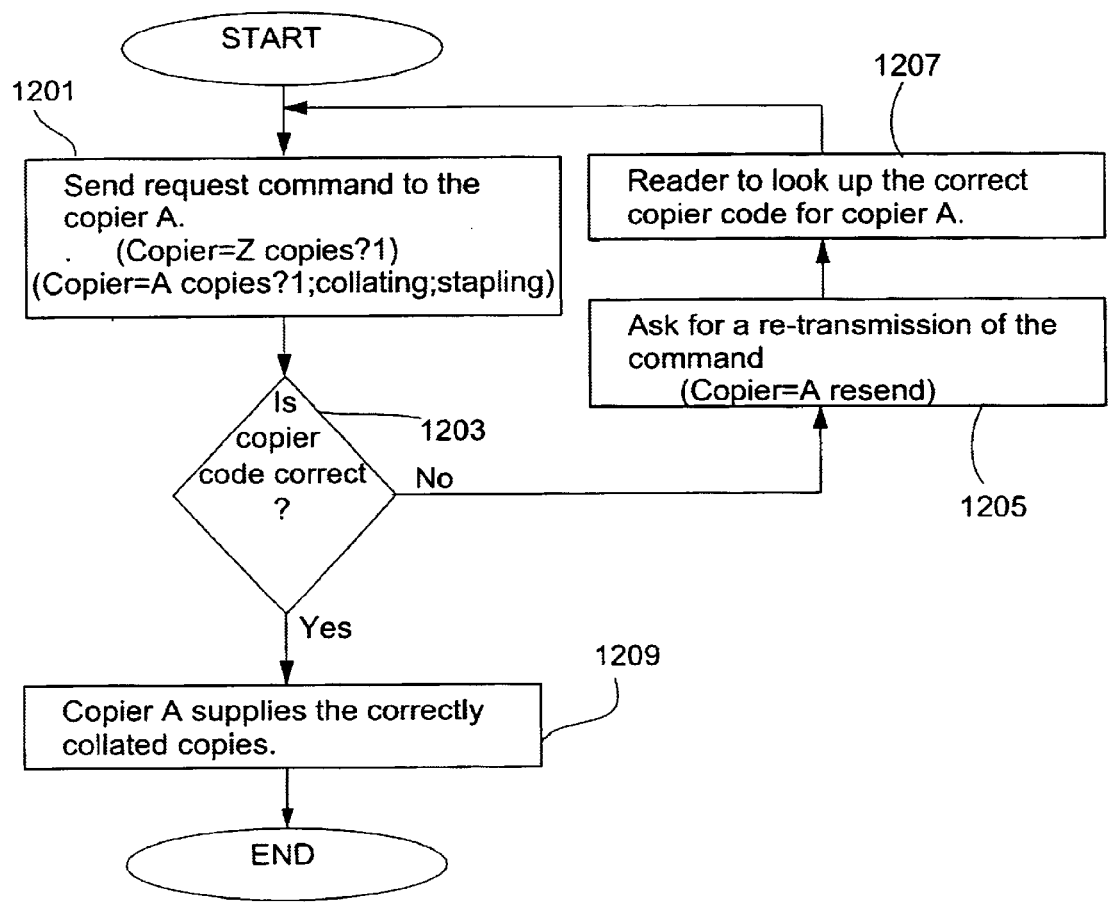
FIG. 12 shows an exemplary smart-card used to contact an appropriate support office.

FIG. 12 shows the sequence of communications that would occur between the smart-card reader 302 and the processors of the photocopiers when the user inserts the smart-card 101 into the reader 302 of copier A after having used the card 101 on a different machine Z. The process begins at step 1201, where the following command is sent to the processor of copier A:

copier= Z;copies?1.

At the next step 1203, the copier A checks to see if the copier code is correct (ie. copier=A). The process continues at the next step 1205, where if the copier code is incorrect, the copier A sends a reply command to the reader 302 mounted on the copier A as follows:

copier=A resend.

At the next step 1207, the reader 302 of copier A can use the new copier code (ie. copier=A) to look up the correct data for the copier A by searching the table stored in the smart-card 101.

The process then returns to step 1201, where the reader 302 mounted on copier A sends the following command to the processor of copier A:

copier=A copies?1; collating;stapling.

The process concludes at the next step 1209, where copier A supplies the photocopies with correct collating and stapling.

When the smart-card 101 of the second embodiment is now taken to another copier (e.g. copier B) and inserted into a smart-card reader 302 mounted on copier B, a different sequence of communications occurs between the smart-card reader 302 mounted on copier B and the processor of copier B, as seen in FIG. 6. The process begins at step 601, where the reader 302 sends the following command to the processor of copier B:

copier=A copies?1;collating;stapling.

The process continues at the next step 603, where the copier B checks to see if the copier code is correct (ie. copier=B). The process continues at the next step 605, where if the copier code is incorrect, copier B requests a change of context from the smart-card reader 302 mounted on copier B by sending the following command:

copier=B resend.

At the next step 607, the reader of copier B can use the new copier code (ie. copier=B) to look up the correct data for the copier by searching the table stored in the smart-card 101 of the second embodiment.

The process then returns to step 601, where the reader 302 mounted on copier B sends the following command to the processor included in copier B:

copier=B copies?1;double-sided.

The process concludes at step 609, where copier B supplies the correct doublesided photocopies.

In a third embodiment of the present invention a user is provided with a card in the form of the smart-card 101, which has been pre-programmed to turn on lights in different rooms in a home. The lighting combinations for the different rooms may differ and are thus included in a table stored in the memory of the smart-card 101, as discussed above. The smart-card 101 of the third embodiment has an icon (not illustrated) for each of the different rooms. A user inserts the smart-card 101 into the reader 302 and merely selects the icon for the respective room which results in the reader 302 searching the table of the third embodiment and a signal being sent to an electronic receiver (not illustrated), via a base station in the form of the base station 903. Subsequently, the lights in the respective room are switched on.

In a fourth embodiment of the present invention a user is provided with a card in the form of the smart-card 101, which has been pre-programmed to select different Television (TV) stations depending on context information. The smart-card 101 of the fourth embodiment includes an icon (not illustrated) labelled "TV". In accordance with the fourth embodiment, the user can decide which television station to tune to depending on the time. For example, the user may decide that before 9 pm, pressing the icon marked TV should cause the television to tune to Channel A, and after 9 pm, pressing the icon marked TV should cause the television to tune to Channel B. In this instance, the context parameter is time and a base station (not illustrated) of the fourth embodiment preferably has an inbuilt clock. Upon receiving a request from the smart-card 101 to tune to a different TV station, the base station of the fourth embodiment searches a table of alternative stations pre-programmed into the memory of the smart-card of the fourth embodiment, and decides which television station to tune to based on a comparison between the table and the in-built clock time. In a further embodiment, multiple context information can be employed, whereby both location and time can be used to select a result from a table stored in the memory of a smart-card.

In accordance with a fifth embodiment of the present invention, which includes all of the features of any-one of the above embodiments, the smart-card 101 can be programmed to send default data or a default command if a requested context alternative does not exist on the smart-card 101. For example, the card could be directed to not resend data or a command if no context matches a request from a card reader. The feature of not resending data or a command if no context matches, has particular application for smart-cards that are programmed to work only in certain contexts (eg. a TV program smart-card that will only work on some TV sets in one home).

In another arrangement users can be provided with a telephone card by which calls to a support office can be placed from wherever the users are in the world. In this arrangement there are three pieces of relevant contextual information, namely the identity of the card reader, the location the call is being made from, and the current time. The identity of the card reader is needed to distinguish between users who are using the same generic card. The location the call is being made from is needed because the access codes for long distance calls may differ from country to country. The current time is needed because the company has offices in different time zones, and depending on the time of day, one of the various offices is assigned to provide on-the-road support.

Figure 15:
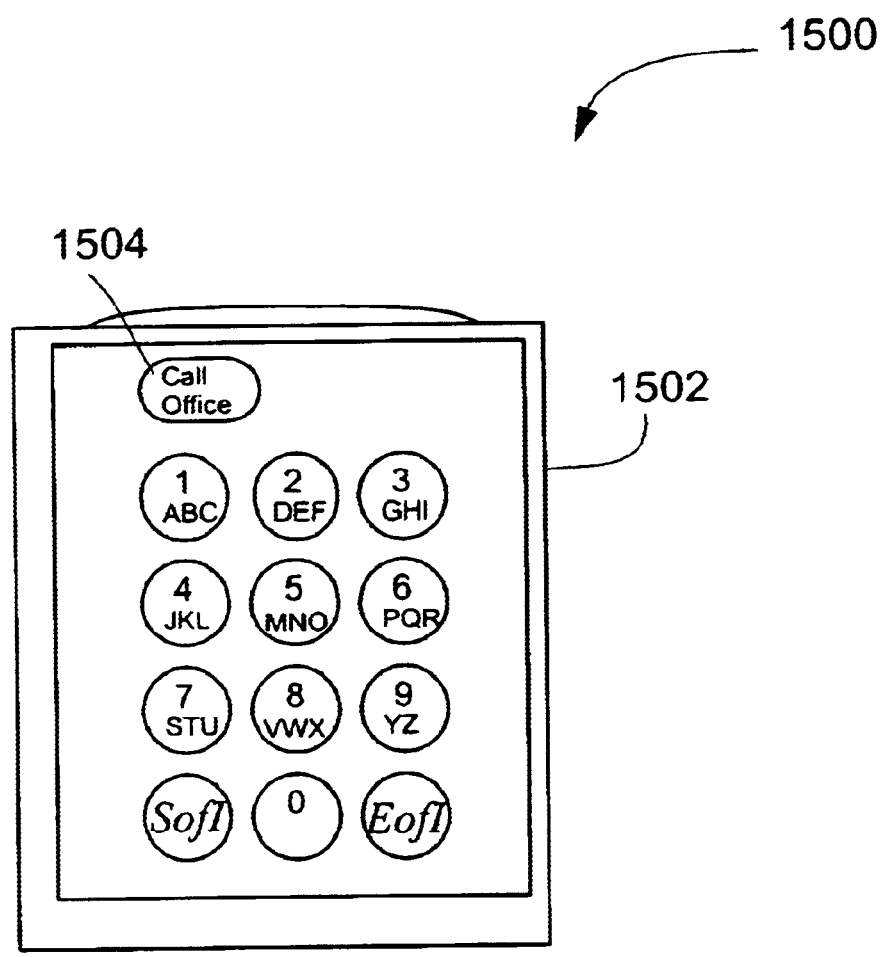
FIG. 15 is a flow chart showing those operations involved in programming the smart-card in accordance with the preferred embodiment.

FIG. 15 shows a smart-card 1500, in a reader 1502, with a button 1504 labelled "Call Office" by which a connection can be made to a support office from anywhere in the world at any time.

Figure 16:
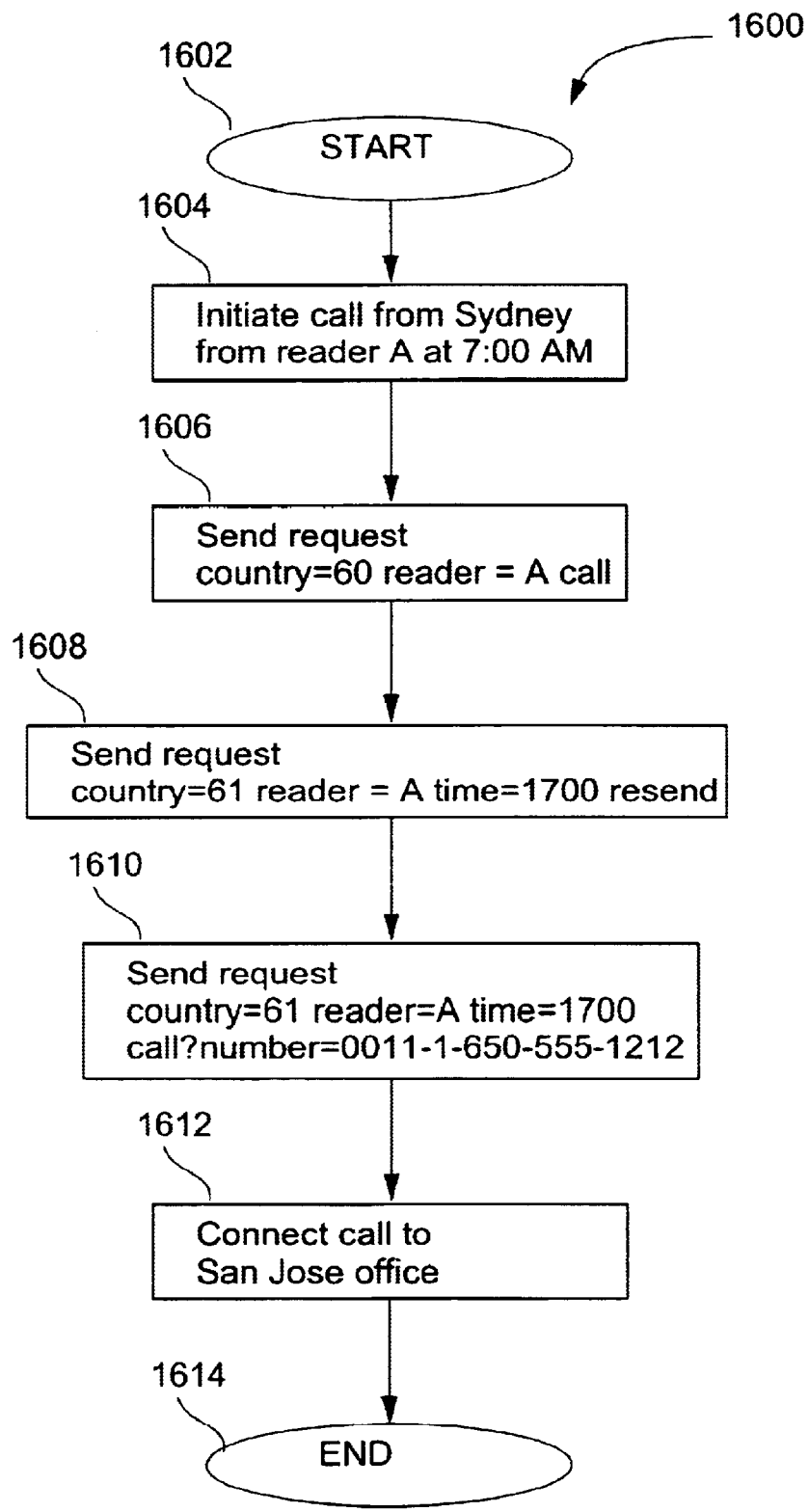
FIG. 16 is a perspective view of a context sensitive smart-card programming system.

Turning to FIG. 16, a process 1600 is shown, comprising a sequence of method steps, for placing a call to the aforementioned support office. It is assumed that two smart-card readers A and B are available (not shown), owned by a technical person and a sales person respectively and that these communicate with "intelligent" telephones.

The process 1600 commences at a step 1602, after which, in a step 1604 the technical person initiates a call by inserting the smart-card 1500 into reader A in a location in Sydney, Australia, at 7 am in the morning. The support office is in San Jose, Calif., USA where it is 6 hours later, or 1 pm. The smart-card has a current setting of country=60 from a previous use in Malaysia. Neither the card 1500, nor the reader A (not shown), stores the time of last use as this always needs to be queried. In a subsequent step 1606, the reader A sends the command:

country=60 reader=A call

It is noted that the reader A sends its own identity, and that it does not send the time, since it does not know the time. In a following step 1608, the intelligent telephone with which the card reader A is communicating determines that the country code is incorrect, and that the time is unknown, and accordingly sends the following request:

country=61 reader=A time=1700 resend

It is noted that the current time is expressed in Greenwich Mean Time (GMT) to avoid ambiguities with time-zones. Next, in a step 1610, the reader A and the smart-card use the above received information about the location and the time to index into a table of stored phone numbers, (stored on the smart-card), and send the following request:

country=61 reader=A time=1700 call?number=0011-1-650-555-1212 which will connect the technical person, in a following step 1612, with the San Jose technical support office. Then the process ends at step 1614.

Figure 17:
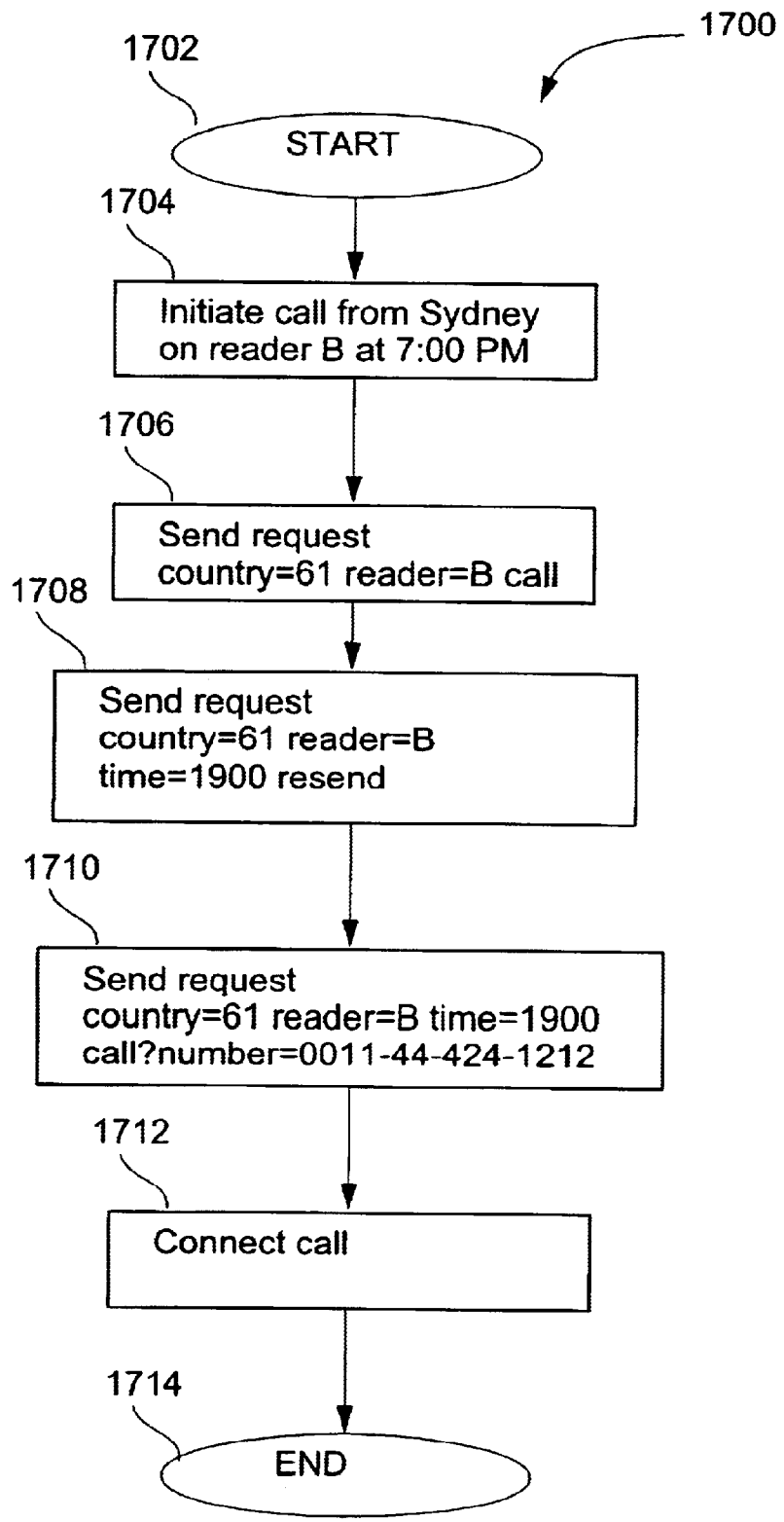
FIG. 17 is a schematic block diagram of a computer system which can be utilised in the embodiments of the present invention.

Turning to FIG. 17, a process 1700 is shown, comprising a sequence of method steps, for another example of placing a call to the aforementioned support office. In this instance, the process 1700 commences at a step 1702, after which, in a next step 1704, a second user, who is a sales person, initiates a call at 7 pm from reader B. At this time, sales support is handled by the UK office where it is 9 am. Pressing the Call button on the card, as depicted in the next step 1706, causes the following to be sent:

country=61 reader=B call where the country code is 61 from a previous use. The intelligent telephone receiving the signal from reader B recognises that the country code is correct, and that the time is missing. The telephone accordingly supplies the information in a next step 1708 as follows:

country=61 reader=B time=1900 resend

The smartcard 1500, together with the reader B respond, in a next step 1710 as follows:

country=61 reader=B time=1900 call?number=0011-44-424-1212 which is the number of the UK sales office. The call is completed in a subsequent step 1712, after which the process 1700 terminates in a step 1714.

Thus it can be seen that the context may be derived from different sources outside of the card, from the reader itself, or from the environment by way of the base station and/or the intelligent telephone at the receiving end. This methods allows the interactive input supplied by the user to be combined with various pieces of contextual information from the environment to arrive at a result string which is then used to obtain the requested service.

In accordance with the above embodiments, the matching of the context information stored on the smart card 101 with a request from a card reader is preferably carried out by matching the character strings stored on the smartcard 101 with a character string sent from the reader. However, it will be appreciated by those skilled in the art that other forms of matching can be used. For example, bit matching can be used where a string of bits stored on the smart card 101, and representing the contextual information, can be matched with a request from a card reader sent in the form of a string of bits. Further, face matching, which is known in the art per se, can be used where a face matching algorithm is utilised to match the contextual information stored on the smart card 101 with a request from a card reader.

The smart-card 101 is preferably programmed by a user or service provider through a programming sequence depicted in the method of FIG. 15. The method of FIG. 15 is preferably practiced using a conventional general-purpose computer system 700, such as that shown in FIGS. 16 and 17 wherein the processes of FIG. 15 may be implemented as software, such as an application program executing within the computer system 700. In particular, the steps of the method of FIG. 15 are effected by instructions in the software that are carried out by the computer system 700. The software may be divided into two separate parts; one part for carrying out the smart-card 101 programming method; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus in accordance with the embodiments of the invention.

Figure 8:
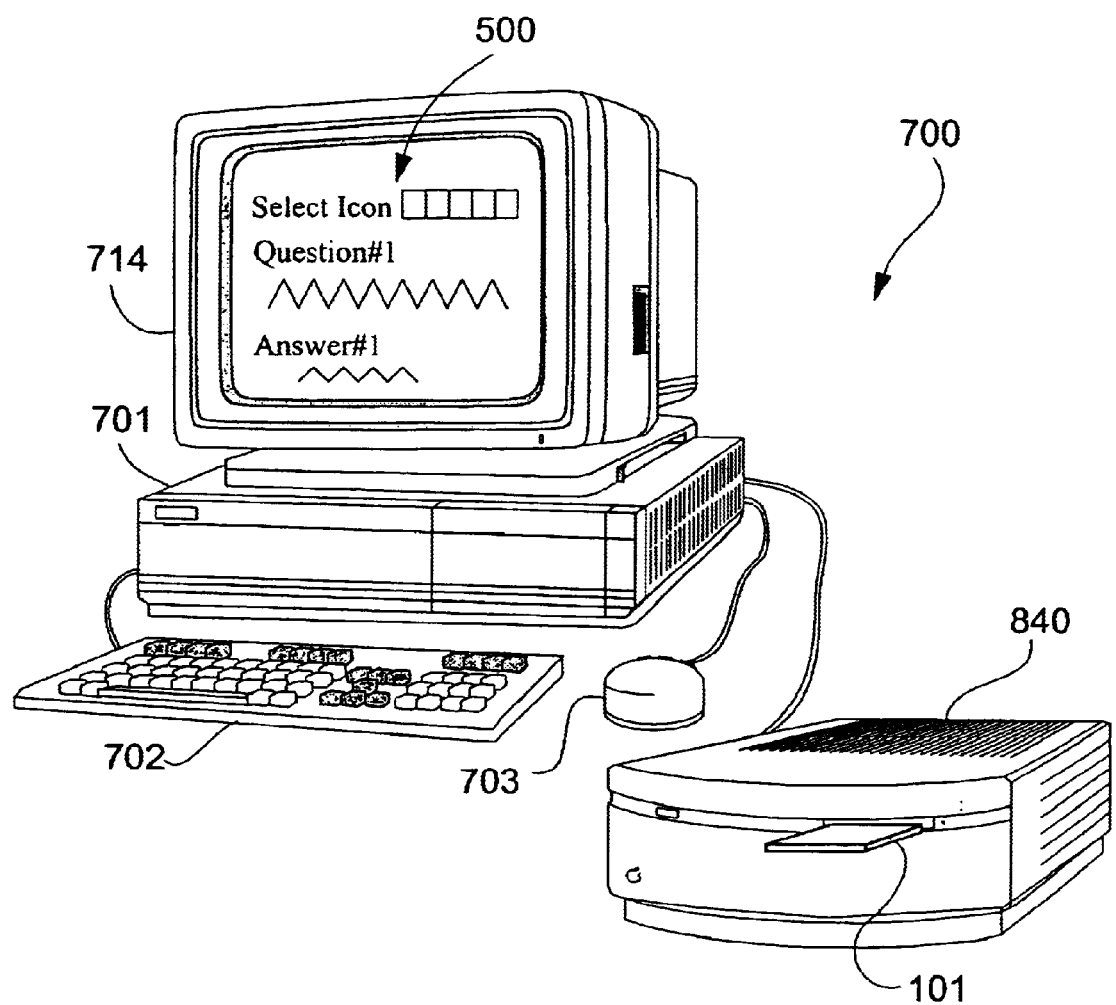
FIG. 8 shows a generic process, in the form of a sequence of method steps, for context sensitive service provision.

As seen in FIG. 8, the computer system 800 comprises a computer module 701, input devices such as a keyboard 702 and mouse 703, and output devices including a smart-card programmer 840 and a display device 714.

Further, and as seen in FIG. 7, a Modulator-Demodulator (Modem) transceiver device 716 may be used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN).

The computer module 701 typically includes at least one processor unit 705, a memory unit 706, for example formed from semiconductor random access memory (RAM) and read only memory (ROM), input/output (I/O) interfaces including a video interface 707, and an I/O interface 713 for the keyboard 702 and mouse 703 and optionally a joystick (not illustrated), and an interface 708 for the modem 716. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 710 and read and controlled in its execution by the processor 705. Intermediate storage of the program and any data fetched from the network 720 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 700 from other computer readable medium including magnetic tape, a ROM or integrated circuit, a magneto-optical disk, a radio or infra-red transmission channel between the computer module 701 and another device, a computer readable card such as a PCMCIA card, and the Internet and Intranets including e-mail transmissions and information recorded on web-sites and the like. The foregoing is merely exemplary of relevant computer readable mediums. Other computer readable mediums may be practiced without departing from the scope and spirit of the invention.

The smart-card programmer 840 is configured to provide for both electronic programming of the computer chip 106 and also for the printing of the various icons 114–128 on to the surface 112 of the security access card 100.

Returning to FIG. 5, the programming process is now described. In process step 500, coordinates for a specified region are entered, while in parallel (or alternatively sequentially) information associated with the region in question is entered in process step 502. With reference to the emergency services telephone card 401, the coordinates of a button, icon or region are x-y coordinate measurements measured from convenient points, say a top left hand corner and bottom right corner of the card 401, while the command information associated with the icon or region is the telephone number for the particular emergency service. Once both these pieces of information are entered via the keyboard 702, they are loaded by the software via the smart-card programmer 840 into the smart-card memory in step 504. This information is stored in the smart-card memory as a member of a table, e.g. {TL, BR, "COMMAND"}. Thereafter in step 506, the programming process tests whether further information is to be programmed onto the card. In the event that further information is required, the programming process is directed back to process steps 500 and 502 as shown by arrow 512. In the event, however, that the programming is complete, the programming process is directed to a process step 508, where the user or service provider is able to select appropriate graphics from the software application. These graphics are printed (step 510) by means of the smart-card programmer 840 onto the smart-card upper surface. The smart-card programmer 840 uses the x-y coordinate measurements entered by the user for printing the graphics at the appropriate locations. it is possible to make use of more complex graphics, and for example a miniature picture of a Fire Engine or Red Cross Sign can be printed on the card 401. It will be apparent that although a simple table-driven arrangement is described here, a general decision or mapping algorithm whereby one or more inputs from a user, and one or more inputs from context result in output of a string can also be used.

It will be appreciated by those skilled in the art that the card reader 302 need not have a transparent touch sensitive panel 356 in the manner of the card reader 302. Instead other touch detecting arrangements can be used. One of these is a regular array of capacitor plates formed in the base of the card reader 302. Since the card 101 is essentially an insulator, the capacitors can sense the approach of the tip of the human finger since the self capacitance of the finger tip disturbs the charge on the opposite capacitor.

Alternatively, the rear face of the smart-card 101 can be printed with conductive ink into a series of pads all set out in a regular array with each pad connected by a corresponding thin connector to a corresponding electrical contact. Again, the approach of a human finger tip against the front face of the smart-card causes a change in charge at the electrode corresponding to the pad opposite the point of approach.

It will also be appreciated by those skilled in the art that the smart card 101 need not include the computer chip 106. Instead other card arrangements can be used. For example, the smart card 101 can include just a memory chip (e.g. a Personal Computer Memory Card Association (PCMCIA) bus card). A corresponding smart card reader (not shown) for this embodiment can include a receptacle such that as the smart card is slid into the reader receptacle an electrical connection is made and the mapping data and contextual information are automatically read from the memory chip by the reader. The mapping data and contextual information can be subsequently processed on a processor external to the smart card of this embodiment. The smart card is then operated as described in relation to the FIG. 1 embodiment.

Further, the smart card 101 can take the form of a control card (not illustrated). The control card still includes a laminar substrate which bears control indicia. However, the storage means in this embodiment takes the form of a magnetic strip (not illustrated) formed along an edge of the reverse face of the control card. The mapping data and contextual information are stored on the magnetic strip in a conventional manner. A corresponding smart card reader device (not shown) for this embodiment includes a magnetic read head positioned at or adjacent an entrance to a corresponding reader receptacle. As the control card is slid into the reader receptacle, the mapping data and contextual information are automatically read from the magnetic strip by the magnetic read head. The control card is then operated as described in relation to the FIG. 1 embodiment.

Still further the smart card 101 can take the form of a card (not illustrated), in which the storage means takes the form of machine readable indicia. The machine readable indicia can take the form of a barcode (not illustrated) formed along an edge of the reverse face of the card. The mapping data and contextual information are suitably encoded, and then printed. A corresponding smart card reader (not shown) for this embodiment includes an optical read head positioned at or adjacent an entrance to an associated reader receptacle. As the card of this embodiment is slid into the reader receptacle, the mapping data is automatically read from the barcode by the optical read head. Alternatively, the barcode can be scanned using a barcode reader associated with the controller immediately prior to inserting the control template, or scanned by an internal barcode reader scanner once the control template has completely been inserted. The card is then operated as described in relation to the FIG. 1 embodiment. It will be appreciated that the position, orientation and encoding of the barcode can be altered to suit a particular application. Moreover, any other form of machine readable indicia can be used, including embossed machine-readable figures, printed alpha-numeric characters, punched or otherwise formed cut outs or even optical or magneto optical indicia.

The foregoing describes only several embodiments of the present invention, and modifications and/or changes can be made thereto without departing from the scope and spirit of the invention, the embodiments being illustrative and not restrictive.

What is claimed is:

1. A context sensitive device for selecting a desired service from a plurality of services each having an attribute depending upon a context of said each service, the context sensitive device comprising:

a card portion having a surface onto which is formed a user interpretable icon; and electronic apparatus attached to said card portion, said electronic apparatus comprising:

a memory in which are retained a plurality of data items each including contextual information associated with a context of a corresponding one of said services, each of said plurality of data items being associated with said icon;

processor means coupled to said memory means; and communication means for coupling said processor means to a reading device configured to facilitate operation of said context sensitive device, wherein said processor means is configured to relate signals (a) generated from a user selection of said icon and (b) received via said communication means with at least one of said retained data items to thus transmit an output signal having contextual information associated with the desired service and enable performance of the desired service based on said contextual information.

2. A method of using a context sensitive device to enable performance of a desired service from a plurality of services each having an attribute depending upon a context of said each service, said context sensitive device comprising:

a card portion having a surface onto which is formed user interpretable icon; and electronic apparatus attached to said card portion, said electronic apparatus comprising:

a memory in which are retained a plurality of data items each including contextual information associated with a context of a corresponding one of said services, each of said plurality of data items being associated with said icon;

processor means coupled to said memory means; and communication means for coupling said processor means to a reading device configured to facilitate operation said context sensitive device;

said method comprising the steps of:

(a) relating signals generated from a user selection of said icon and received via said communication means with at least one of said retained data items including associated said contextual information;

(b) transmitting an output signal including said at least one retained data item, wherein said output signal indicates said desired service;

(c) comparing said contextual information in the output signal to an actual context of the desired service; and (d) enabling said performance of said desired service based on said comparison.

3. The method according to claim 2, wherein said reading device further comprises a transceiver apparatus for receiving and analyzing said output signal in order to carry out said comparison and thus to enable performance of said desired service based on said comparison.

4. The method according to claim 3, wherein said transceiver apparatus is coupled to said context sensitive device via a communications channel.

5. The method according to claim 2, wherein said performance of said desired service is enabled if said contextual information in the output signal matches the actual context of the desired service, otherwise transmission of another said output signal having contextual information matching the actual context of the desired service is requested.

6. The method according to claim 5, comprising the further step of comparing said plurality of data items with a subsequently received data item upon said request for transmission of another said output signal.

7. The method according to claim 6, comprising the further step of transmitting another output signal based on said comparison of said plurality of data items with said subsequently received data item.

8. The method according to claim 2, wherein said performance of said desired service is enabled if said portion of contextual information falls within a predetermined range, otherwise transmission of another said output signal having contextual information matching the actual context of the desired service is requested.

9. A method according to claim 2, wherein said reading device comprises a touch panel configured to overlay said surface and through which said icons are visible to said user.

10. The method according to claim 2, wherein said contextual information is related to position.

11. The method according to claim 2, wherein said contextual information is related to time.

12. A context sensitive device for selecting a desired service from a plurality of services each having an attribute depending upon a context of said each service, the context sensitive device comprising:
    a card portion having a surface onto which is formed a user interpretable icon and an electronic apparatus attached to said card portion, said electronic apparatus comprising:
        a memory in which are retained a plurality of data items each including contextual information associated with a context of a corresponding one of said services, each of said plurality of data items being associated with said icon;
        processor means coupled to said memory means; and
        communication means for coupling said processor means to a reading device configured to facilitate operation of said context sensitive device,
        wherein said processor means is configured to transmit, upon selection of the icon, an output signal including contextual information from one of the retained data items, for indicating the desired service based on said contextual information.

13. A context sensitive device according to claim 12, wherein the reading device further comprising a transceiver apparatus for receiving and analyzing said output signal in order to enable or reject a performance of said desired service based on said contextual information.

14. A context sensitive device according to claim 13, wherein said transceiver apparatus is coupled to said context sensitive device via a communications channel.

15. A context sensitive device according to claim 12, wherein said performance of said desired service is enabled if said contextual information in the output signal matches the actual context of the desired service, otherwise transmission of another said output signal having contextual information matching the actual context of the desired service is requested.

16. A context sensitive device according to claim 15, wherein said processor means is configured to compare said plurality of data items with a subsequently received data item upon said request for transmission of another said output signal.

17. A context sensitive device according to claim 16, wherein said processor means is configured to transmit another output signal based on said comparison of said plurality of data items with said subsequently received data item.

18. A context sensitive device according to claim 12, wherein said performance of said desired service is enabled if said contextual information falls within a predetermined range, otherwise transmission of another said output signal having contextual information matching the actual context of the desired service is requested.

19. A context sensitive device according to claim 12, wherein said contextual information is related to position.

20. A context sensitive device according to claim 12, wherein said contextual information is related to time.

21. A context sensitive device for selecting a desired service from a plurality of services each having an attribute depending upon a context of said each service, the context sensitive device comprising:
    a card portion having a surface onto which is formed a user interpretable icon;
    a memory in which are retained at least a plurality of data items each including contextual information associated with a context of a corresponding one of said services, each of said data items being associated with said icon; and
    communication means for coupling said memory to a processor means of a reading device configured to facilitate operation of said context sensitive device,
    wherein said processor means is configured to relate signals (a) generated from a user selection of said icon and (b) received via said communication means, with at least one of said retained data items to thus transmit an output signal having contextual information associated with the desired service and enable performance of the desired service based on said contextual information.

22. A context sensitive device according to claim 21, wherein the reading device further comprises a transceiver apparatus for receiving and analyzing said output signal in order to enable or reject a performance of said desired service based on said contextual information.

23. A context sensitive device according to claim 22, wherein said transceiver apparatus is coupled to said context sensitive device via a communications channel.

24. A context sensitive device according to claim 21, wherein said performance of said desired service is enabled if the contextual information in the output signal matches the actual context of the desired service, otherwise transmission of another said output signal having contextual information matching the actual context of the desired service is requested.

25. A context sensitive device according to claim 24, wherein said processor means compares said plurality of data items with a subsequently received data item upon said request for transmission of another said output signal.

26. A context sensitive device according to claim 25, wherein said processor means is configured to transmit another output signal based on said comparison of said plurality of data items with said subsequently received data item.

27. A context sensitive device according to claim 21, wherein said performance of said desired service is enabled if contextual information in the output signal falls within a predetermined range, otherwise transmission of another said output signal having contextual information matching the actual context of the desired service is requested.

28. A context sensitive device according to claim 21, further comprising additional user interpretable icons wherein said icons comprise a first set of icons providing for user generation of said retained data items, and a second set of icons corresponding to those said icons associated with said retained data items.

29. A context sensitive device according to claim 28, wherein said signals generating from user selection of said icons comprise position information of said icons on said surface and said memory means and processor means together perform a mapping function to associate said position information with individuals characters of said data items to thereby interpret a user selection of a plurality of icons of said first set with one of said data items.

30. A context sensitive device according to claim 28, wherein said second set of icons each comprise an image.

31. A context sensitive device according to claim 28, wherein said first set of icons depict at least an alphanumeric character set.

32. A context sensitive device according to claim 31, wherein said first set of icons further depicts at least one control function associated with forming said signals generated from user selection of said icons.

33. A context sensitive device according to claim 21, wherein said reading device comprises a touch panel configured to overlay said surface and through which said icons are visible to said user.

34. A context sensitive device according to claim 21, wherein said contextual information is related to position.

35. A context sensitive device according to claim 21, wherein said contextual information is related to time.

36. A context sensitive service provision system for providing a desired service from a plurality of services each having an attribute depending upon a context of said each service, the system comprising:
  a control template, adapted for insertion into a template reader, the template (i) having a user selectable control icon, and (ii) storing a plurality of data items associated with said icon, each said data item incorporating contextual information associated with a context of a corresponding one of said services;
  said reader, being responsive to a user selection of said control icon of an inserted said control template, said reader being adapted to communicate a signal including one of said associated data items; and
  a service provision device, responsive to a communicated said signal, and adapted to provide a service corresponding to the associated data item dependent upon the contextual information contained in said communicated signal.

37. A context sensitive service provision system according to claim 36, wherein the reader and the service provision device are physically separate entities which communicate using a communication channel.

38. A context sensitive service provision system according to claim 36, wherein the reader and the service provision device are integrated into a single physical entity.

39. A context sensitive service provision system according to claim 36, wherein
  the reader has reader contextual information associated therewith, said reader contextual information being communicated in the signal;
  the service provision device has device contextual information associated therewith defining the actual context of the service provision device;
  the service provision device is further adapted to provide the desired service if the device contextual information matches at least one of the contextual information and the reader contextual information contained in said communicated signal; and
  the service provision device is further adapted to (i) communicate the device contextual information to the reader, and (ii) request at least one of updated contextual information and updated reader contextual information, if the device contextual information does not match at least one of the contextual information and the reader contextual information contained in said communicated signal.

40. A context sensitive service provision system according to claim 36, wherein said desired service is provided if at least one of the contextual information and the reader contextual information contained in said communicated signal falls within range defined by the device contextual information.

41. A context sensitive service provision system according to claim 36, wherein said control template further comprises a first set of user selectable control icons providing for user generation of data items, and a second set of user selectable control icons with which said data items are associated.

42. A context sensitive service provision system according to claim 36, wherein at least one of the reader contextual information, and the device contextual information are related to corresponding locations of said reader and said device.

43. A context sensitive service provision system according to claim 36, wherein at least one of the reader contextual information, and the device contextual information are related to a time at which the user selection of said at least one control icon takes place.

44. A control template, adapted for insertion into a template reader having an independent storage means, said template reader for use in a context sensitive service provision system for providing a desired service from a plurality of services each having an attribute depending upon a context of said services, the control template comprising:
  a control indicium printed on a surface of the control template, the control indicium for use by a user when the control template is coupled to the template reader to thereby communicate a data item incorporating contextual information associated with the context of the desired one of said services; and
  storage means for storing a plurality of data items associated with said indicium, each said data item incorporating contextual information associated with a context of a corresponding one of said services.

45. A method of providing a context sensitive service, said service being one of a plurality of services each having an attribute depending upon a context of said each service, the method comprising steps of:
  inserting a control template into a template reader, the template (i) having a user selectable control icon, and (ii) storing a plurality of data items associated with said icon, each said data item incorporating contextual information associated with a context of a corresponding one of said service;
  selecting, by a user, said control icon;
  communicating, by said reader, in response to the user selection, a signal including said associated data item having contextual information associated with said context sensitive service;
  receiving, by a service provision device, of said communicated signal; and
  providing, by the service provision device, a service corresponding to the associated data item dependent upon the contextual information contained in said communicated signal.

46. A method of providing a context sensitive service according to claim 45, comprising further steps of:
  communicating, by the reader, reader contextual information associated with the reader; wherein:
    if device contextual information associated with the service provision device matches at least one of the contextual information and the reader contextual information contained in said communicated signal, the providing step is performed; and wherein:
if the device contextual information does not match at least one of the contextual information and the reader contextual information contained in said communicated signal, the providing step is preceded by the steps of:
communicating, by the service provision device, device contextual information to the reader; and
requesting, by the service provision device, at least one of updated contextual information and updated reader contextual information.

47. A computer readable medium for storing a program for a system providing a context sensitive service from a plurality of services each having an attribute depending upon a context of said each service; wherein a control template is inserted into a template reader, the template (i) having a user selectable control icon, and (ii) storing a plurality of data items associated with said icon, each said data item incorporating contextual information associated with a context of a corresponding one of said services; and wherein said control icon is selected by a user, said program comprising:
code for a communicating step, for communicating, by said reader, in response to the user selection, a signal including said associated data item;
code for a receiving step, for receiving, by a service provision device, of said communicated signal; and
code for a providing step, for providing, by the service provision device, a service corresponding to the associated data item dependent upon the contextual information contained in said communicated signal.

48. A computer readable medium according to claim 47, further comprising:
code for a communicating step, for communicating, by the reader, reader contextual information associated with the reader;
code for a communicating step, for communicating, by the service provision device, device contextual information to the reader if the device contextual information does not match at least one of the contextual information and the reader contextual information contained in said communicated signal; and
code for a requesting step, for requesting, by the service provision device, at least one of updated contextual information and updated reader contextual information.

49. A computer readable medium for storing a program for using a context sensitive device to enable performance of a desired service from a plurality of services each having an attribute depending upon a context of said each service, wherein said context sensitive device comprises:
a card portion having a surface onto which is formed a user interpretable icon, and electronic apparatus attached to said card portion; said apparatus comprising:
(a) a memory in which are retained a plurality of data items each including contextual information associated with a context of a corresponding one of said services, each of said data items being associated with said icon;
(b) processor means coupled to said memory means; and
(c) communication means for coupling said processor means to a reading device configured to facilitate operation of said context sensitive device;
said program comprising:
code for a relating step for relating signals (i) generated from a user selection of said icon and (ii) received via said communication means, with at least one of said retained data items;
code for a transmitting step for transmitting an output signal including said retained data item, wherein said output signal indicates said desired service;
code for a comparing step for comparing said contextual information to the actual context of the desired service; and
code for an enabling step for enabling said performance of said desired service based on said comparison.

50. A control template, adapted for insertion into a template reader connected to an environment for use in a context sensitive service provision system for providing a desired service from a plurality of services each having an attribute depending upon a context of said plurality of services, the environment having an independent storage means comprising an additional contextual information, the control template comprising:
a user selectable control icon; and
storage means for storing a plurality of data items associated with said control icon, each of said plurality of data items incorporating contextual information associated with a context of a corresponding one of said plurality of services,
wherein the contextual information and the additional contextual information instigate a request for at least one of said plurality of services.

51. A method of transmitting information between a context sensitive device and one of a plurality of service devices, said method comprising the steps of:
selecting one of a plurality of services;
reading out a first data item from a memory of the context sensitive device, wherein said first data item includes first contextual information associated with a context of said selected service, and wherein said memory retains a plurality of data items, each of said data items including contextual information associated with a context of a corresponding one of said services;
transmitting an output signal including said read-out first data item to said service device;
judging whether or not to change the output signal based on information in a signal transmitted from said service device;
reading out a second data item from said memory, wherein said second data item includes second contextual information associated with a context of said selected service device; and
retransmitting the output signal including said read-out second data item to said service device.

52. The method according to claim 51, further comprising the step of comparing said contextual information in the output signal to said information in the signal transmitted from said service device, wherein said judging in said judging step judges whether or not to change the output signal based on said comparison.

53. The method according to claim 51, wherein said information in the signal transmitted from said service device is transmitted when the contextual information in the output signal transmitted from said context sensitive device differs from a context of said service device.

54. A context sensitive device for transmitting an output signal to one of a plurality of service devices, said device comprising:

selecting means for selecting one of a plurality of services;

memory means for retaining a plurality of data items, each of said data items including contextual information associated with a context of a corresponding one of said services;

first reading means for reading out a first data item, from said memory means, said first data item including first contextual information associated with a context of said selected service;

transmitting means for transmitting the output signal including said read-out first data item to said service device;

judging means for judging whether or not to change the output signal based on information in a signal transmitted from said service device;

second reading means for reading out a second data item, from said memory means, said second data item including second contextual information associated with a context of said selected service; and retransmitting means for retransmitting the output signal including said read-out second data item to said service device.

55. The device according to claim 54, further comprising comparing means for comparing said contextual information in the output signal to said information in the signal transmitted from said service device, where said judging means judges whether or not to change the output signal based on said comparison.

56. The device according to claim 54, wherein said information in the signal transmitted from said service device is transmitted when the contextual information in the output signal transmitted from said context sensitive device differs from a context of said service device.

57. A method of transmitting information between a context sensitive device and one of a plurality of service devices, said method comprising the steps of:

selecting one of a plurality of services;

receiving information in a signal transmitted from said service device;

reading out a data item from a memory of the context sensitive device, said data item including contextual information associated with a context of said selected service included in said received signal; and transmitting an output signal including said read-out data item to said service device to communicate between said context sensitive device and said service device for said selected service.

58. The method according to claim 57, further comprising the steps of:

comparing said contextual information in the output signal to said information in the signal transmitted from said service device; and judging whether or not to change the output signal based on said comparison.

59. The method according to claim 57, wherein said information in the signal transmitted from said service device is transmitted when the contextual information in the output signal differs from a context of said service device.

* * * * *